United States Patent [19]

Santulli et al.

[11] 3,752,940

[45] Aug. 14, 1973

[54] LINE VERIFICATION TESTER

[75] Inventors: Vincent F. Santulli, Manhasset, N.Y.; George Manos, Bridgeport, Conn.; John J. Gazzo, Jr., Commack, N.Y.; William P. Roumanos, Shelton, Conn.

[73] Assignee: Porta Systems Corp., Roslyn, N.Y.

[22] Filed: July 10, 1972

[21] Appl. No.: 270,058

[52] U.S. Cl. ........................................ 179/175.2 R

[51] Int. Cl. ........................................ H04m 3/26

[58] Field of Search ................ 179/175.2 R, 175.21, 179/175.23

[56] References Cited

UNITED STATES PATENTS 3,265,820 8/1966 Edwards ........................ 179/175.21

*Primary Examiner*—Kathleen H. Claffy
*Assistant Examiner*—Douglas W. Olms
*Attorney*—Philip D. Amins

[57] ABSTRACT

Card programable line verification tester apparatus iteratively and automatically establishes connections via old and replacement (e.g., ESS) switching apparatus to subscriber loop appearances on a main distributing frame. The assumed continuous tip and ring conduction paths are then tested for faults such as spurious battery, or short, open, high impedance or crossed connections.

18 Claims, 6 Drawing Figures

LINE VERIFICATION TESTER

DISCLOSURE OF INVENTION

This invention relates to telephony and, more specifically, to automatic, card programable line verification testing apparatus operative to facilitate replacement of central office switching and control apparatus.

The burgeoning demand for increased telephone communications capacity is being met in part by the replacement of older, electromechanical switching apparatus (e.g., panel, stepping or crossbar) with the faster, more flexible stored program controlled electronic switching systems (ESS). One requisite of the replacement process is that integrity of subscriber service be maintained during the transition period. This, in turn, dictates that connections and functioning for the new ESS apparatus be verified before cut over.

However, rapid and reliable verification-tester apparatus for supervising the replacement process has not heretofore been available.

It is therefore an object of the present invention to provide improved line verification tester apparatus.

More specifically, an object of the present invention is the provision of line verification test apparatus which is card programable; which provides complete and meaningful fault reporting; and which is rapidly operative.

The above and other objects of the present invention are realized in specific, illustrative line verification testor apparatus for exercising old and replacement switching apparatus multiply connected to a subscriber pair terminating main distributing frame. The verifier structure includes subscriber input records (e.g., in card form) and a record reader — each record comprising at least subscriber equipment numbers for the existing and replacement switching apparatus, and also any desired literal information desired for the output record. An output peripheral such as a printer is also employed.

During testing for any subscriber line, the input record is read into registers, and nonsynchronous digital and automatic dialer circuitry establish connections via each of the old and new switching structure to what should be the two subscriber appearances on the main distributing frame, completing closed tip and ring loops if all is in order.

Plural fault tests (e.g., spurious battery, short circuit, open or high resistance circuit, and tip-ring reversal) are then conducted, and the results stored. Finally, subscriber identifying information, reproduction of any literals, and a fault record is generated at the printer.

The above process iteratively and automatically recurs. until all subscriber positions have been tested.

Figure 6:
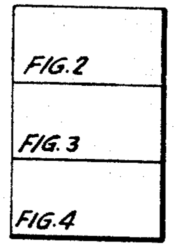
Figure 1:
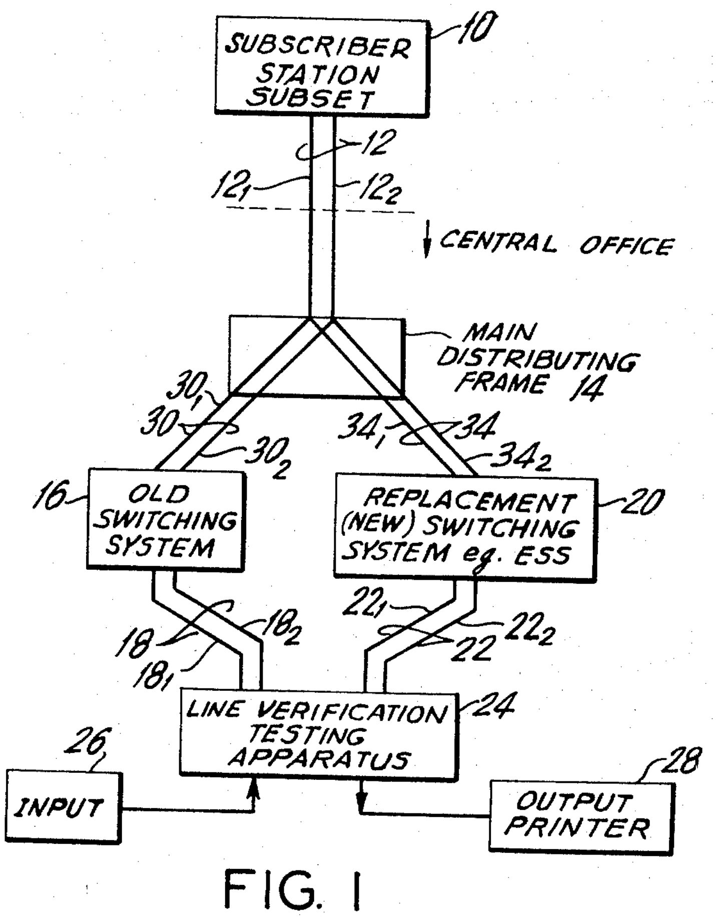
Figure 5:
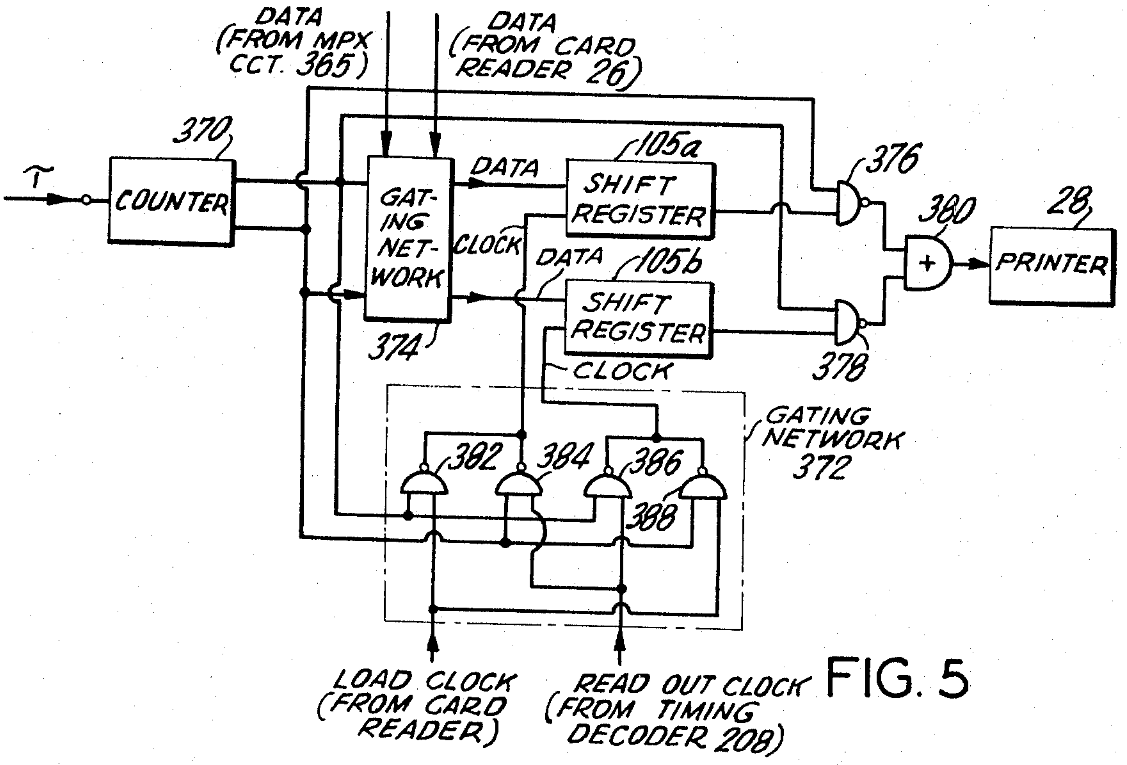
Figure 2:
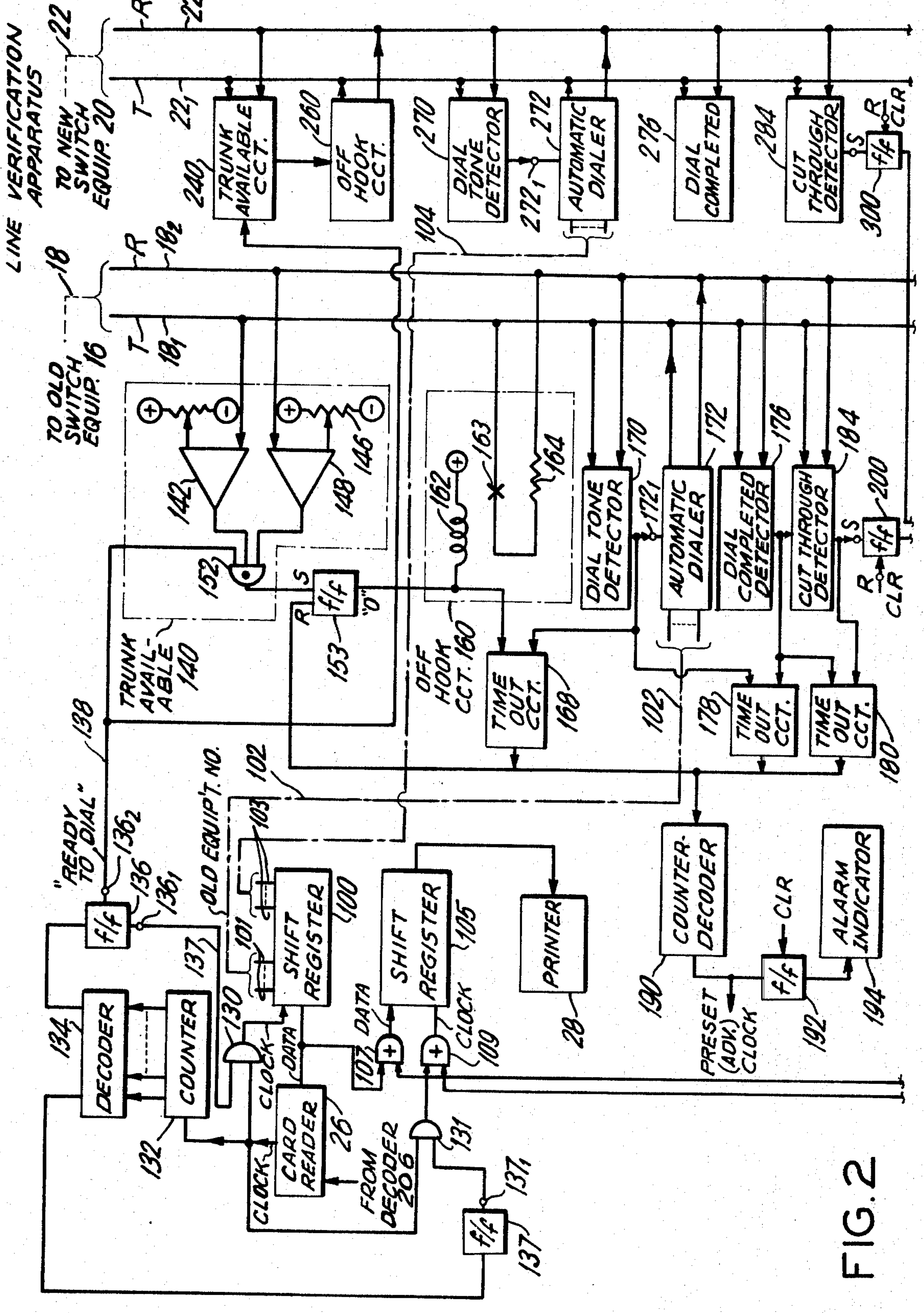
Figure 3:
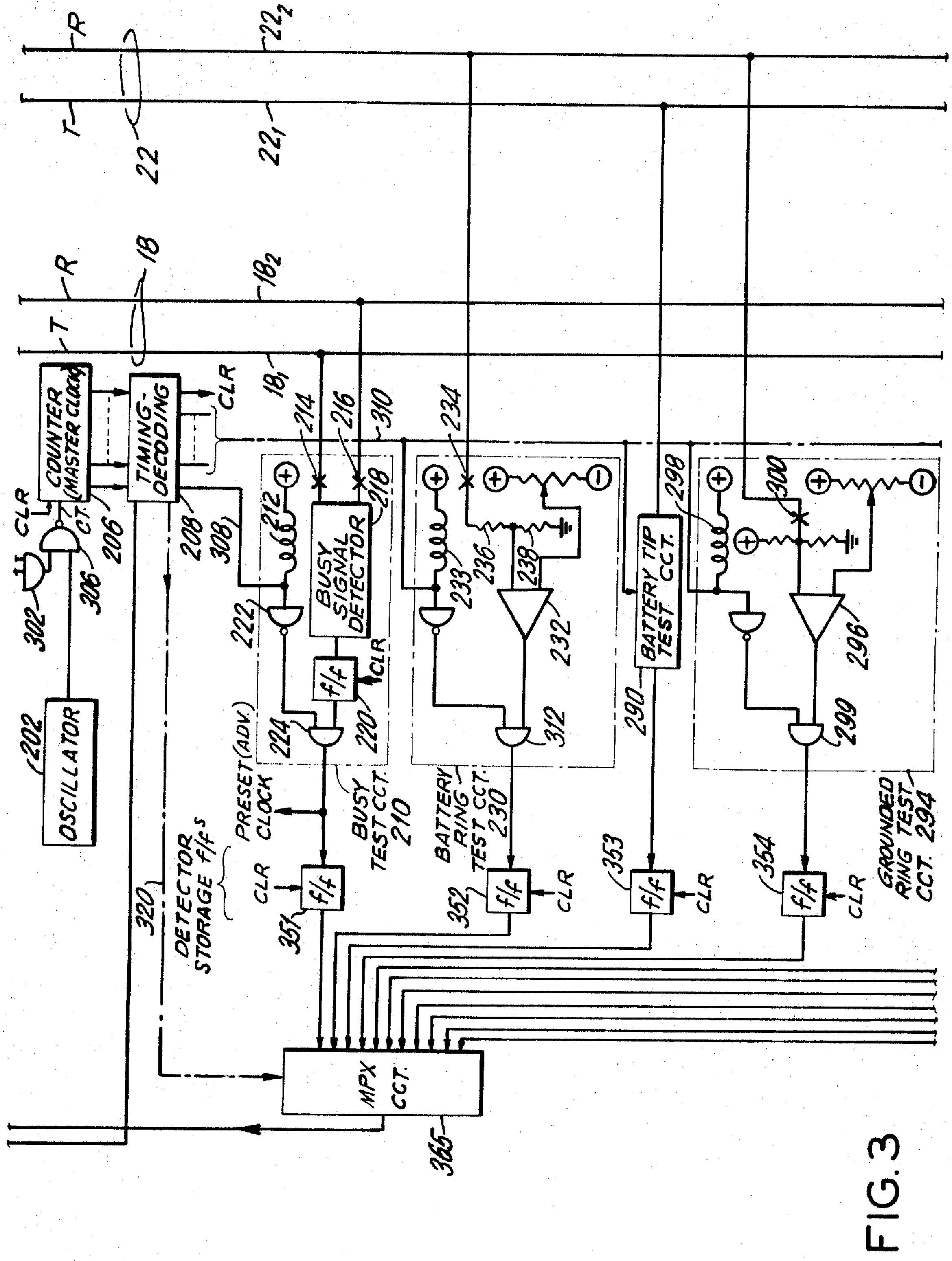
Figure 4:
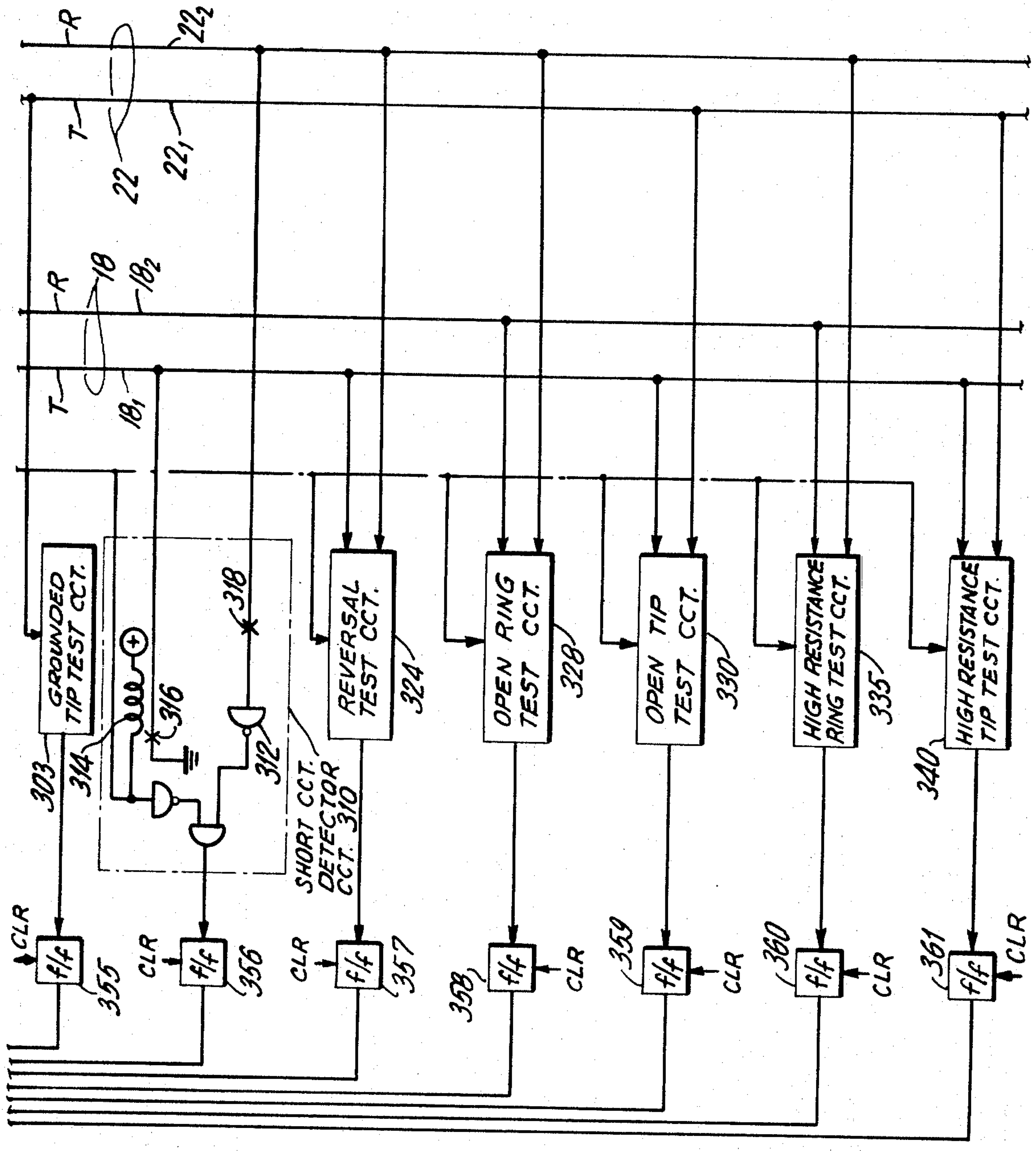

The above features and advantages attendant to the present invention will become more clear from the following detailed description of a specific embodiment thereof, presented in detail hereinbelow in conjunction with the accompanying drawings, in which:

FIG. 1 is a generalized block diagram illustrating the overall operation of the instant line verification testing apparatus;

FIGS. 2–4, arranged as in FIG. 6, depict in detailed block diagram form line verification tester apparatus embodying the principles of the present invention;

FIG. 5 illustrates alternative apparatus for effecting time-overlapping data input-output flow in accordance with one aspect of the present invention; and FIG. 6 reflects the spatial arrangement of FIGS. 2–4.

Referring now to FIG. 1, there is shown in very generalized overview a block diagram illustrating the nature, purpose and context of the present invention. In particular, a telephone subscriber station subset 10, illustrative of the other, typically thousands of subscribers associated with a particular central office, is connected to the central office, via a cable pair 12. The cable pair 12 for each subscriber is physically routed within the central office to terminate at a main distributing frame 14, thereby having two "appearances" thereon. As a general matter all connections for the subscriber subset 10 of FIG. 1 to any other telephone subscriber, either within that same central office or via appropriate trunks, carrier links and/or the like to any other telephone set whereever located, is made by establishing a conduction path to the two cable pair 12 appearances on the main distributing frame 14.

An old-form switching system 16 is included in the central office, and comprises the on-line equipment at that office — i.e., the switching structure actually in service. The switching apparatus 16 may be of any type, e.g., panel, step by step, or cross bar, and effects connections to and from all subscribers associated with the central office in a well known manner.

To accommodate the increasing demands on the capacity of the existing telephone plant, and to otherwise improve telephone service by employing new, state of the art telephone equipment made possible by technology advances, the existing switching equipment presently obtaining in many telephone central offices is being replaced by electronic switching system (ESS) equipment which operates in a more rapid and flexible manner vis-a-vis prior art equipment, and which otherwise possesses the advantages accruing to solid state, stored program controlled equipment. Such newer replacement switching equipment 20 is shown in FIG. 1.

The line verification testing apparatus 24 of the present invention is utilized in the replacement process, i.e., the replacement of the older switching system 16 by the ESS equipment 20. In particular, the line verification testing apparatus assures that the new equipment 20 establishes proper connections to all exchange subscriber appearances on the main distributing frame 14 responsive to appropriate dial signaling. This will assure minimum transition difficulties when cut over between the older and replacement equipment 16 and 20 is effected.

To this end, an input record source 26, e.g., a card reader loaded with a deck of cards each associated with a different subscriber, supplies input program sequencing control for the verification apparatus 24, and the results of testing are supplied as an output record, e.g., a hard copy output record developing printer 28.

Each card in the input hopper or reader 26 is read in turn, and supplies to the verification testing apparatus 24 the equipment number for both the old switching system 16 and the new switching system 20 for that subscriber (the equipment number corresponds to the subscriber telephone number, but with the exchange digits deleted as unnecessary). Assuming that the old and new switching apparatus 16 and 20 function properly, the switching systems 16 and 20 should both establish connections from the test apparatus 24 to the same tip and ring appearance of the subscriber cable pair 12 on the main distributing frame 14. Thus, two completed (tip and ring) conductor loops connected to the line verification testing apparatus 24 are formed. More specifically, one completed conduction path is formed via the trunk and switching equipment associated links $18_1$, $30_1$, $34_1$ and $22_1$ (assumed as tip conductors), and a second distinct loop form via conductors $18_2$, $30_2$, $34_2$, and $22_2$ (the ring loops). The verification testor apparatus 24 automatically effects dialing to exercise the switching apparatus 16 and 20 for establishing these loop connections, and also implements various tests to determine that the anticipated connections in fact exist, and are not subject to various faults discussed in detail hereinbelow.

After testing associated with one subscriber is completed, a record of the test results is generated at the output printer 28, any faults being noted therein. The output record includes the identify of the subscriber for whom the record is being made, and any literal record desired. Such a literal record may comprise a replica of any alpha-numeric information contained on the card at input source 26, such as the routing path of the subscriber's cable pair in the central office.

The ensemble of records produced at the output printer 28 thus completely characterizes performance of the ESS switching equipment 20. To the extent that any faults are reported, appropriate remedial action may be taken, and the efficacy thereof verified by a retest.

The printed record also reports which subscriber lines were busy, and which therefore could not be tested. The cards for these subscribers may be extracted from the deck in reader 26, and rerun at any desired time.

With the above overview in mind, attention will now be directed to FIGS. 2–4 which depict the line verification testing apparatus 24 of FIG. 1 in detail. The arrangement is shown as receiving information from the card reader 26 (FIG. 2); for generating an output record at the printer 28 (FIG. 2); and for communicating with the switching system 16 and 20 and ultimately the main distributing frame 14 via the trunks 18 and 22.

At the beginning of the operative testing procedure for each subscriber, the card reader 26 serially reads data from a card into a shift register 100. The card reader 26 also supplies timing clock pulses synchronously with the recorded digital information. During the initial portion of a card reading operation, the clock pulses pass through an AND gate 130 which is partially enabled by an initially high output at a terminal $136_1$ of a flip-flop 136. For purposes of simplicity, coincidence logic is shown in the form of AND or NAND gates as convenient, and disjunctive logic is shown as OR or NOR gates as convenience warrants. It will be appreciated by those skilled in the art that any form of logic gate or gates may be used in proper combinations to develop all system logic, perhaps current sinking NAND gates being the most common.

The initial information on the card being processed and produced by the reader 26, comprises a first series of digits which represent the new telephone (i.e., equipment) number for the subscriber under test, i.e., the telephone number (absent the exchange identifying digits if desired) dialing of which causes the new switching system 20 to reach the subscriber appearance on the main distributing frame 14 via conductive path 34. The following series of digits supplied by the card reader 26 comprises the old telephone number of the subscriber, i.e., that which causes the old switching system 16 to reach the same subscriber main distributing frame terminals. It is observed that the numbers may be the same or may be different if a new number is assigned to the subscriber at cut over, as sometimes occurs.

The first series of digits read from the card by the card reader 26, comprising the new and old subscriber telephone numbers, are serially read into the shift register 100 under control of the clock pulses generated by the card reader. Thus after a sufficient number of columns of the card have been read, i.e., when both numbers are completely contained in the shift register 100, the new telephone number digits appear at shift register output terminals 103, while the later generated old equipment number appears at shift register output terminals 101. It is also noted that the clock pulses generated by the card reader 26, which occur for each card column read by the card reader, are supplied to a counter 132 the output of which is decoded by 1-of-*n* decoder 134. A decoder output, enabled when the new and old subscriber equipment numbers are fully contained and properly positioned in the shift register 100, switches the flip-flop 136 at such time to thereby disable the coincidence gate 130. Thereafter, clock pulses at the output of the card reader 26 are inhibited from reaching the data shifting clock input of the shift register 100. Thus, the old and new equipment numbers are locked in the shift register 100 for the remainder of card reader operation, and remain present at the shift register output terminals 101 and 103, respectively, for the remainder of subscriber equipment processing.

It is also observed that the data read from the card reader 26 also flows via an OR gate 107 into the data input terminal of a shift register 105. Similarly, the clock output of the card reader 26 is coupled by way of an AND gate 131 initially enabled by flip-flop 137, and an OR gate 109, into the clock input of the shift register 105. The shift register 105 is thereby loaded with the new and old telephone numbers for the subscriber station under test, this information ultimately being supplied to the printer 28 as subscriber identification information in the printed output record.

As a first system function as above described with respect to FIG. 1, the old and new switching systems 16 and 20 respectively must each establish a connection to the main distributing frame 14 responsive to dialing of the subscriber equipment number as an input thereto. The old telephone equipment number for the subscriber, i.e., that which actuates the switching system 16, present at the shift register output terminals 101, is connected via a conductor buss 102 to an automatic dialer 172 of any form well known to those skilled to the art. Similarly, the new telephone equipment number at the shift register output terminals 103 is connected by a plural connector buss 104 to an automatic dialer 272 associated with the trunk 22 connected to the replacement ESS switching system 20. The automatic dialers 172 and 272 remain inactive until enabled at enabling nodes $172_1$ and $272_1$ by the output of dial tone detectors 170 and 270, respectively, in the manner described below.

The manner in which connections are established for the switching systems 16 and 20 to the subscriber appearances on the main distributing frame 14 will now be considered.

After the old and new equipment numbers are fully contained in the shift register 100 (and thereby communicated to the automatic dialers 172 and 272 by busses 102 and 104), the flip-flop 136 is set by the counter-decoder 132–134 as above discussed. The switched output of flip-flop 136 present at an output terminal $136_2$ attains a digital state at such time to partially enable a coincidence gate 152 in a "trunk available" circuit 140 (and in a comparable circuit 240). The manner in which a connection is established via the old switching system 16 will now be treated in detail herein; comparable elements and system functioning accomplish like performance for the ESS equipment 20.

The function of the trunk available circuit 140, as a first step in the process of establishing a connection via the switching apparatus 16, is to determine whether or not the test trunk 18 is available for testing operation, or whether that trunk is busy and thus cannot be applied to test operation. To this end, and for purposes of concreteness, it is observed that in one common form of telephone equipment, a trunk is available if the tip and ring conductors thereof are respectively at ground and −48 volts. Accordingly, the trunk available circuit includes two comparators 142 and 148 which have one input thereof connected to the tip and ring trunk conductors $18_1$ and $18_2$, respectively. The other input of the comparators 142 and 148 is connected to a suitable reference potential which may be set, for example, by adjusting the tap of a potentiometer having its terminals connected to positive and negative potentials.

Thus the reference input to the comparator 142 may be adjusted such that the comparator will provide an output only if the potential on the tip trunk conductor $18_1$ is at ground potential (e.g., more positive than a small negative potential at the reference input). The reference input to the comparator 148 may be established such that the comparator 148 develops an enabling output potential only when the voltage on the ring trunk conductor $18_2$ is more negative than some reference potential which may be set at a voltage intermediate zero and −48 volts (indeed, such an intermediate potential will suffice for both comparators).

Assuming the trunk is available for testing, both comparators 142 and 148 will supply binary 1 output signals which together with the 1 output of the flip-flop 136 will fully switch the AND gate 152. The resulting output of the AND gate 152 (present only when the trunk is available for testing and dialing information is fully loaded in shift register 100 and communicated to the automatic dialers 172 and 272) supplies an enabling signal to an "off hook" circuit 160 by setting a flip-flop 153.

The function of the off hook circuit 160 is to signal the tip and ring trunk conductors $18_1$ and $18_2$ that a receiver has gone off hook, and is requesting an originating sender so that it may furnish connection establishing address signaling (dialing). Off hook requests are typically the appearance of a particular relatively low impedance across the tip and ring conductors, e.g., 600 ohms. The off hook circuit may simply comprise a relay 162 which is enabled by the ground going 0 output of the set flip-flop 153, and which closes a set of normally open form A contacts 163. The engaged contacts 163 connect a resistor 164 across the trunk 18 to provide the requisite off hook supervisory signaling.

The switching apparatus 16 responds to the off hook request on the trunk 18 by supplying dial tone to the trunk. In the dial tone condition, the voltages supplied to the tip and ring trunk conductors $18_1$ and $18_2$ reverse, i.e., the ring conductor $18_2$ is now grounded, while the tip conductor $18_1$ receives the −48 volt potential. The incidence of the dial tone condition is detected by a dial tone detector 170 which may comprise circuitry essentially identical to the trunk available circuit 140, but with the comparator input leads reversed. It is noted that dial tone can be detected on an alternating current basis as well, in any well known manner.

When the dial tone is detected by the circuitry 170, the resulting detector output potential enables the automatic dialer 172 by applying a suitable binary potential at the dialer enabling input port $172_1$. The automatic dial 172 then impresses dialing address signaling information on the trunk 18 to communicate the subscriber telephone number to switching apparatus 16. If the equipment 16 is working satisfactorily, the switching system 16 establishes a connection to the subscriber appearances on the main distributing frame 14 via the conduction path 30.

When dialing is completed, the direct current potentials on the trunk 18 again reverse, the tip $18_1$ being grounded and ring conductor $18_2$ being at −48 volts. This is detected by dial completion detector 176 (again structure essentially identical to the trunk available circuit 140) which enables a "cut through" (i.e., connection established) detector 184. Storage means not shown, e.g., a flip-flop, is employed to inhibit operation of a detector 176 until dial tone has been detected.

The function of the cut through detector 184 is to confirm that a connection has in fact been established by the switching circuit 16. Cut through signalling is manifested in various ways in different types of switching equipment, e.g., a momentary open tip and ring in a panel office, and signalling via a special lead in other types of office. The recognition equipment for cut through is well known to those skilled in the art and will not be set forth in detail herein. Once cut through is effected by the old form switching system 16, the cut through detector 184 sets a flip-flop 200 for the remainder of the subscriber testing cycle of operation.

As above noted, an essentially like sequence of system operation, in conjunction with essentially like equipment, is operative with respect to the trunk 22 and the new ESS equipment 20 for establishing a connection to the subscriber main distributing frame appearances via the ESS equipment. A flip-flop 300 is set when cut through for the new equipment is verified by detector structure 284.

The output of the flip-flops 200 and 300 which signals cut through for the ESS switching apparatus, initiates operation of the testing portion of subscriber functioning described in detail hereinbelow.

The above described structure has thus been shown to automatically "dial" the equipment number for both the old and new switching equipment 16 and 20, and to thereby establish tip and ring connections to the subscriber appearances on the main distributing frame 14 if all is in order.

Provision is also made for situations wherein some system nonfunctioning occurred in the above described non-synchronous automatic dialing process. Such structure is shown only for the old dialer equipment, it being understood that like structure obtains for dialing with respect to the ESS apparatus. In particular, a plurality of time out circuits 168, 178 and 180 are provided to reinitiate the dialing process, i.e., to provide a disconnect (on hook--off hook) sequence to again seek dial tone, when an expected performance associated with the dialing process has not developed within a permissible predetermined time period. Thus, for example, an output of the time out circuit 168 gives rise to an off hook signal when the dial tone detector 170 does not signal receipt of dial tone within a permissible interval after a first off hook signal; another time out circuit 178 reinitiates off hook signalling if a dial completion signal is not provided by the detector 176 within a maximum permissible period after dial tone detector 170 signals the initial receipt of dial tone; and a further time out circuit 180 reinstitutes the dialing process if cut through does not occur within a maximum permissible period after a dial completion signal. Any form of time out circuit may be employed to momentarily reset the off hook flip-flop 153, e.g., a set-reset flip-flop driving an integrator, comparator and differentiator.

The outputs of the circuits 168, 178 and 180 are counted in a counter-decoder 190 and an alarm flip-flop 192 is set if more than a maximum permissible number of dialing attempts are undertaken. The set flip-flop 192 energizes an alarm display 194 for visual and audible signaling to an operator at the line verification tester that dialing could not be accomplished. Further, the set state of flip-flop 192 inhibits further operation of the composite apparatus until the fault is cleared.

The above discussion has related to that portion of the line verification system which implements subscriber identification signaling to the old and new switching apparatus 16 and 20. We treat now the testing sequencing automatically effected by the composite line verification tester apparatus of FIGS. 2–4 after dialing ends.

As above noted, at the completion of dialing, both of the flip-flops 200 and 300 have been set by cut through detectors 184 and 284, thereby fully switching an AND gate 302 and partially enabling an AND gate 306. This permits the binary output wavetrain of an oscillator 202 to pass through the gate 306 and advance a binary counter 206 which starts from a cleared state. The outputs of the plural counter 206 stages are coupled to a timing decoding and logic network 208 which decodes the counter outputs (e.g., 1-of-*n* decoding), and which includes OR logic for combining plural counter 206 states when plural count conditions are dedicated to any particular system function (alternatively, plural count states may be developed by decoding only the more significant counter stages).

It is observed that telephone dialing proceeded in essentially a nonsynchronous manner wherein each particular portion of the automated dialing process occurred when the next prior necessary part of that process was completed. Correspondingly, the testing portion of a composite subscriber testing cycle of operation proceeds in a predetermined, clocked manner, each task being done in a pre-allotted (but possibly overlapping) time slot corresponding to particular states of the advancing counter 206.

As a first function, the verification apparatus examines the trunk 18 associated with the switching equipment 16 (which alone is in actual service) to determine whether the subscriber line is busy. In this regard, the preallotted time slot for this function is signalled by a low potential on a timing network output lead 308 which energizes a relay 212 during the appropriate period, thereby closing two dependent form A contacts 214 and 216. These contacts connect the trunk 18 which, in turn, is connected to the subscriber station set 10 and cable pair 12, to the input of a busy signal detector 218. The detector 218 may comprise any circuit well known to those skilled in the art for detecting the conventional low frequency alternating current busy tone (or relay closure for other forms of central office equipment) provided when a station set being called is already in service. After a busy condition is detected, the output of the detector 218 acts through an AND gate 224 (partially enabled by a NAND gate 222 during the busy signal examining period) to set a flip-flop 351. The output of the gate 224 may be employed to preset the counter 206 to an advanced state such that all remaining system tests are skipped — it being impossible when the subscriber set is in service to in fact perform such tests. Responsive to such a condition the signal administrative tasks for the subscriber such as system resets and output printing are completed in the manner discussed below, and the card for the next following subscriber is read to initiate a new cycle of operation for the next subscriber.

It is observed at this point that the flip-flop 351 is one of an array of flip-flops 351-361 and 192 which store digital information to be printed in the record made for subscriber testing. Also, all flip-flops and counters are cleared before the beginning of a subscriber testing cycle.

If the subscriber subset 10 under test is not busy, no output is generated by the detector 218 and the flip-flop 351 is not set. The counter-timer 206 is not advanced; and all other subscriber line testing functions are implemented.

The specific tests performed by the testing apparatus of FIGS. 3 and 4 are as follows (in the order assumed, although the order is a matter of design choice): (1) battery ring (i.e., some spurious voltage applied to the assumed closed ring path — $18_2$, $30_2$, $34_2$ and $22_2$ of FIG. 1); (2) battery tip (spurious voltage on the assumed closed tip path $18_1$, $30_1$, $34_1$ and $22_1$); (3) grounded ring path; (4) grounded tip path; (5) short circuit between tip and ring; (6) reversal (i.e., crossed connections) of tip and ring; (7) open ring path (noncontinuity between the conductors $18_2$ and $22_2$ in FIG. 1); (8) open tip; (9) high resistance ring path (examination for an inordinately high closed ring path, e.g., greater than 3K ohm); and (10) high resistance tip path. It is observed with respect to the above that all of the trunk conductors 18 and 22 being tested should be dry, i.e., floating without any potential thereon if all system equipment has functioned properly, since the first test effected by the busy test circuit 210 has already verified that the subscriber station set 10 is not in use. The circuit functioning for each of these operations will now be treated in turn.

A system buss 310 comprising plural outputs of the timing circuit 208 is distributed to each of a plurality of test circuits and energizes each in turn so that each test may be conducted independently. This is the simplest approach to the problem, although plural noninterfering testing may be simultaneously conducted to shorten the operative subscriber line testing cycle. During the time interval associated with each test, an associated one of the flip-flops 352 through 361 remains in its initially cleared state, e.g., output binary 0, if no fault is detected during the test. Correspondingly, when a fault condition is noted, the corresponding flip-flop of the array 352–361 is set to eventually give rise to a printed record identifying the particular fault.

The first assumed test is for spurious battery ring. To this end, a relay 233 is activated by a conductor in the buss 310 to connect the input of a comparator 232 to the old trunk ring conductor $18_2$. The other comparator input is connected to a reference potential. If a potential (assumed to be negative since typical telephone potentials are zero volts [ground] and –48 volts) is spuriously present on the ring connector $18_2$ (or thereby also any other link in the ring loop), this will be more negative than the reference potential supplied at the other comparator input. The output of the comparator will thereby switch setting the associated information storage flip-flop 352 via an AND gate 312 which is enabled during the appropriate testing interval. If no spurious battery is present on the ring conductor loop, the comparator 232 does not switch, and the flip-flop 352 remains in its initial reset condition.

Similar testing is effected by a spurious battery tip conductor test circuit 290 which sets a storage flip-flop 353 if battery is present on the old trunk tip conductor $18_1$ and not otherwise.

As the next system function, a test circuit 294 examines the trunk ring lead $18_2$ (and thereby also the ring conductors $30_2$, $34_2$ and $22_2$ which are connected to the trunk lead $18_2$ if the switching equipment has performed properly) for ground potential — it will be recalled that all trunk conductors should be dry and floating. To this end, during the appropriate timing interval, a relay 298 is actuated to connect the conductor $18_2$ to a voltage divider at one input of a comparator 296, the other input of the comparator being connected to a suitable reference potential. If the continuous ring loop $18_2$ through $22_2$ is indeed floating, the comparator input voltage at the median point of the voltage divider does not change; the comparator output does not switch; and thus nothing is communicated via the output AND gate 299 to the flip-flop 354 which remains in its initial reset condition. However, if ground potential is somehow inadvertently applied to the ring conductor path, the median voltage at the voltage divider markedly decreases, switching the comparator and registering a fault signal in the flip-flop 354.

Similar testing is done by the tip conductor test circuit 303 during a following time interval to set the flip-flop 355 if and only if ground is somehow spuriously applied to the tip trunk loop $18_1$ through $22_1$. It was observed above that several of the tests performed by the composite tester apparatus of FIGS. 2–4 may be simultaneously done to reduce the time required for each testing cycle. Thus, for example, the tests effected by the circuits 294 and 303 may be coincidentally performed (with some small loss in the information content of the test report for compound faults of low statistical probability).

The tip and ring conduction loops are next tested for a short circuit therebetween. To accomplish this, a relay 314 is closed during an appropriate time interval via a lead in the buss 310. A first form A contact 316 enabled at this time by the coil 314 applies ground to one of the trunk 18 conductors, e.g., the tip conductor $18_1$, and the other trunk 18 conductor $18_2$ is connected via a second relay contact 318 to an input of a NAND gate 312 (assumed of the current sinking type, i.e., requiring a low impedance path to ground, at a low potential, to signal an input binary 0, or a relatively high input potential or a high impedance to signal an input binary 1). If, somehow, a short circuit exists between the tip and ring trunks anywhere in the path 18–30–34–22, that short circuit will provide a low impedance path to ground at the input of the NAND gate 312. The resulting binary 1 at the output of the gate will set the flip-flop 356 to register the fault. Conversely, if as is proper no conduction path exists between the tip and ring conductors $18_1$ and $18_2$, the input to the gate 312 is floating (high or infinite impedance to ground) to develop a low or binary 0 output for the gate 312 which does not set the flip-flop 356.

In a manner similar to the testing operations described in detail above, test circuit 324 enters a fault signal in storage flip-flop 357 if there is a reversal between tip and ring conductors; a circuit 328 sets a flip-flop 358 if the assumed continuous ring loop $18_2$–$30_2$–$34_2$–$22_2$ is not a low impedance in fact; and an open tip test circuit 330 sets a flip-flop 359 if interruption exists anywhere in the assumed continuous tip loop $18_1$–$30_1$–$34_1$–$22_1$. Finally, high resistance ring and tip test circuits 330 and 335 set flip-flops 360 and 361 if and only if the tip and ring conduction paths exhibit an impedance higher than some maximum acceptable value (e.g., 3K ohms).

The reversal test circuit 324 may simply comprise circuitry corresponding to the short circuit detector 310 wherein ground is applied to one conductor of the trunk 18, e.g., tip conductor $18_1$ and the input of a gate examines the ring $22_2$ conductor of the other trunk 22. If all is in order, conductor $22_2$ is floating and flip-flop 357 is not set. However, where a reversal obtains, the input of the NAND gate is grounded thus not setting the flip-flop 357.

The open ring test circuit 328 may also comprise circuitry comparable to the structure 310, but employing an AND rather than a NAND logic gate. Ground is applied to one ring conductor — as the trunk lead $18_2$, and the ring conductor at the other end of the loop — $22_2$ — is examined for ground which should appear. If ground is missing, the ring loop is incomplete and the flip-flop 358 is set. The test circuit 330 performs identically to the structure 328, but operating on the tip path $18_1$ through $22_1$.

Finally, the high resistance test circuits 335 and 340 may comprise structure essentially identical to the grounded ring test circuit 294, but also employing a second relay contact to ground one of the tip or ring conductors as appropriate (the tip or ring loop is thus connected by the relay between the voltage divider mid-point and ground). If, as is proper, the connection to the node of the voltage divider provides a relatively low impedance to ground (less than 3K ohms), the comparator in each test circuit 335 and 340 does not switch and the flip-flop 360 or 361 remains in its initial condition. However, if the continuous tip or ring, as appropriate, provides a high impedance to ground, the voltage at the median point in the voltage divider increases to exceed the comparator reference potential such that an error indication is registered in the flip-flop 360 or 361.

Thus, following the above circuit operation, the trunks 18 and 22 have been variously tested to reflect all typical equipment faults. The results of these tests are registered in the array of flip-flop 352-361, and in the flip-flop 351 which reflects a busy subscriber set 10.

The states of each of the information storage flip-flop 351–361 are connected as inputs to a digital multiplexing circuit 365 which receives gating information via a conductor buss 320 from the system timing decoding circuit 208. In the manner well known, the ditigal states of the flip-flops 351–361 are sequentially gated to the output of the multiplex circuit 365 as during consecutive time periods decoded by the decoder 208. This information descriptive of the test results and test process is then registered into the shift register 105 via the OR gate 107. It is also observed that clocking for the shift register 105 at this time is also generated by the time decoder network 208.

Thus following such operation, the shift register 105 is loaded with both subscriber identifying information (the equipment numbers for both the old and new switching which were loaded into the shift register during the initial portion of the subscriber testing cycle of operation), and also the test results associated with that subscriber which were loaded after testing was completed. It is observed, however, that the test cycle may be shortened if desired by loading the test results into the shift register as they are produced rather than awaiting completion of all testing, suitable timing obviously being available from the timing decoder network 208 corresponding to that which enables each of the test circuits 210, 230 et seq. Further a hybrid of such real time accumulated test result register 105 loading may be employed.

Finally, to complete operation of the line verification testing apparatus, further clock states for the master counter 206 decoded by the circuitry 208 clock all information out of the shift register 105 into a serial printer 28 which thereby generates the subscriber record. As a final housekeeping function, the timing decoder 208 issues a clear pulse for a particular state of the counter 206 at the end of a subscriber testing cycle to reset all systems flip-flops, counters, registers and the like, and to cause the card reader 26 to read the next subscriber card to initiate a new testing cycle of operation.

The above described arrangement has thus been shown to automatically establish connections to subscriber appearances on a main distributing frame via old and replacement switching systems, and to test for all common faults associated with nonperformance or malperformance of the switching equipment. After connections for all subscribers have been verified as proper, and all repairs reported necessary by the printed test results have been effected, the ESS switching apparatus is cut through into service and the old switching system 16 taken off line and removed.

As a final matter, and with respect to FIG. 5 it is observed that some saving in time for subscriber processing may be effected by overlapping in time some performance of the shift registers 100 and 105. More specifically, it is observed that information for a next subscriber may be read to a shift register 100 at the same time that information is being read out of the shift register 105 for printing of the results of the previous testing procedure. Apparatus for implementing this is shown in FIG. 5, wherein two shift registers 105*a* and 105*b* are employed in place of the single unit 105 in FIG. 2 In the arrangement of FIG. 5, the shift registers 105*a* and 105*b* are alternately employed in differing modes during the sequential cycles of operation, one of the registers receiving incoming information for the next subscriber station while the other unit supplies information to the printer reporting the results of the prior testing cycle. Control for the shift registers 105*a* and 105*b* is implemented by a toggle counter 370 which switches its state once each subscriber cycle, as by counting clear pulses issued by the timing decoder 208 at the completion of a testing cycle. Gating networks 372, 374 (the network 372 being shown in detail and the network 374 being essentially identical thereto), 376 and 378 effectively operate in the manner well known per se to connect the data and clock inputs of one shift register in a data receiving mode, and to connect the clock input terminal and the output terminal of the other shift register, via an OR gate 380 coupled to the printer 28, in an output data reporting mode under control of counter 370.

The above described arrangement is merely illustrative of the principles of the present invention. Numerous modifications and adaptations thereof will be readily apparent to those skilled in the art without departing from the spirit and scope of the present invention. Thus, for example, the apparatus may be operated in a manual mode, rather than automatically sequencing to process an ensemble of subscribers. Any form of manual entry device, e.g., a keyboard, may load all requisite information into the system registers.

What is claimed is:

1. In combination in line verification tester apparatus for exercising and testing first telephony switching means and second telephony switching means each connected to like subscriber pair distributing frame means, each of the first and second switching means having tip and ring conductor means connected thereto, said verification tester apparatus being connected by selected ones of the conductor means to each of the first and second switching means, said verification tester apparatus comprising record programmable input means for sequentially reading a plurality of input records each of which includes subscriber numbers for each of the first and second telephony switching means, first register means for receiving and storing said subscriber numbers, means responsive to said subscriber numbers stored in said first register means for signaling the first and second telephony switching means to establish connections to like terminals of the distributing frame means via selected other ones of the conductor means, testing means for testing for continuous and independent tip and ring conductor paths of the conductor means, second register means for storing the results of the operations effected by said testing means, and test result signaling means.

2. A combination as in claim 1 wherein said signaling means includes a plurality of automatic dialers, each of said automatic dialers being associated with a selected one of said first and second telephony switching means.

3. A combination as in claim 2 wherein said signaling means further comprises means for signaling an off hook condition to each of said first and second telephony switching means, means for detecting dial tone issued by each of said first and second telephony switching means, said dial tone detecting means enabling an associated one of said automatic dialers.

4. A combination as in claim 1 wherein said telephony switching means signaling means comprises time out means for reattempting to signal said switching means a predetermined number of times.

5. A combination as in claim 4 further comprising counter means connected to said time out means for providing an alarm indication after a predetermined number of said reattempts.

6. A combination as in claim 1 wherein said testing means comprises detector means for examining a selected pair of the conductor means for a busy signal indication.

7. A combination as in claim 6 wherein said busy signal detector means comprises means responsive to the incidence of a busy signal for inhibiting further testing.

8. A combination as in claim 1 wherein said testing means comprises means for examining selected ones of the conductor means for spurious potential.

9. A combination as in claim 1 wherein said testing means comprises means for examining selected of the tip and ring conductor means for a short circuit therebetween.

10. A combination as in claim 1 wherein said testing means comprises means for examining assumed completed tip and ring conduction paths for reversal therebetween.

11. A combination as in claim 1 wherein said testing means comprises means for examining tip and ring conductor paths for continuity.

12. A combination as in claim 1 wherein said testing means comprises means for examining an assumed continuous path formed by selected ones of the conductor means for a high impedance.

13. A combination as in claim 1 wherein said testing means comprises means for effecting plural fault tests upon selected ones of the tip and ring conductor means, third register means for storing therein the results of said plural tests effected by said testing means, and means for loading said second register means with the results of said testing stored in said third register means.

14. A combination as in claim 13 wherein said second register loading means comprises multiplexing means for serially supplying fault recording information thereto.

15. A combination as in claim 1 wherein said testing means comprises detector means for examining a selected pair of the conductor means for a busy signal indication, means for examining selected ones of the conductor means for spurious potential, means for examining selected ones of the tip and ring conductor means for a short circuit therebetween, means for examining assumed completed tip and ring conductor paths for continuity, and means for examining an assumed continuous path formed by selected ones of the conductor means for a high impedance.

16. A combination as in claim 1 further comprising logic gating network means for loading information from said input means into said first register means coincident with extracting information from said second register means for communicating said test result signaling means.

17. A combination as in claim 1 wherein said input means comprises card reader means and plural subscriber record storing cards loaded in said card reader means.

18. A combination as in claim 17 wherein said test results signaling means comprises printer means.

* * * * *

UNITED STATES PATENT OFFICE
CERTIFICATE OF CORRECTION

Patent No. 3,752,940 Dated August 14, 1973

Inventor(s) VINCENT F. SANTULLI, ET. AL.

It is certified that error appears in the above-identified patent and that said Letters Patent are hereby corrected as shown below:

Column 14, claim 15 should read as follows:

-- A combination as in claim 1 wherein said testing means comprises detector means for examining a selected pair of the conductor means for a busy signal indication, means for examining selected ones of the conductor means for spurious potential, means for examining selected ones of the tip and ring conductor means for a short circuit therebetween, means for examining assumed completed tip and ring conductor paths for reversal therebetween, means for examining tip and ring conductor paths for continuity, and means for examining an assumed continuous path formed by selected ones of the conductor means for a high impedance. -- .

Signed and sealed this 22nd day of January 1974.

(SEAL)
Attest:

| | |
|---|---|
| EDWARD M.FLETCHER,JR. | RENE D. TEGTMEYER |
| Attesting Officer | Acting Commissioner of Patents |